United States Patent [19]
Johnson

[11] 3,860,105
[45] Jan. 14, 1975

[54] BREADING MACHINE CONVEYOR

[75] Inventor: Richard T. Johnson, Sandusky, Ohio

[73] Assignee: Sam Stein Associates, Inc., Sandusky, Ohio

[22] Filed: Apr. 9, 1973

[21] Appl. No.: 349,374

Related U.S. Application Data

[62] Division of Ser. No. 192,170, Oct. 26, 1971, Pat. No. 3,762,363, which is a division of Ser. No. 2,239, Jan. 12, 1970, Pat. No. 3,647,189, which is a division of Ser. No. 740,701, June 2, 1968, Pat. No. 3,547,075.

[52] U.S. Cl. .............................. 198/122, 198/281
[51] Int. Cl. ............................................. B65g 21/02
[58] Field of Search ........ 118/13, 16, 500; 198/113, 198/122, 159, 281, 117

[56] References Cited
UNITED STATES PATENTS

| | | | |
|---|---|---|---|
| 2,357,679 | 9/1944 | Moench, Jr. | 118/13 |
| 2,855,893 | 10/1958 | Greer et al. | 118/16 |
| 3,596,633 | 8/1971 | Porter et al. | 118/16 |

*Primary Examiner*—John P. McIntosh
*Attorney, Agent, or Firm*—Baldwin, Egan, Walling & Fetzer

[57] ABSTRACT

A machine for coating a food product with breading material has an elevated hopper for storing the breading material and means for feeding the same in a smooth and controlled manner from the hooper, through a free-flowing downspout to be deposited on a belt beneath the food product, together with means for feeding the breading material in a smooth and controlled manner from the hopper to be deposited on top of the food product with a control valve at such outlet to control the rate of feed. A hooded portion of open mesh belt conveyor is provided near the discharge end of the machine with air spray pipes above the belt to remove excess material, and the hood is adapted to be raised without interrupting the operation of the machine. In a modification, a flip bar is provided across the conveyor belt toward the discharge end of the machine to flip over the product so as to shake out breading material lodging in cavities of the food product, together with a novel arrangement for taking up excess length of the belt after it passes over the raised flip bar.

1 Claim, 14 Drawing Figures

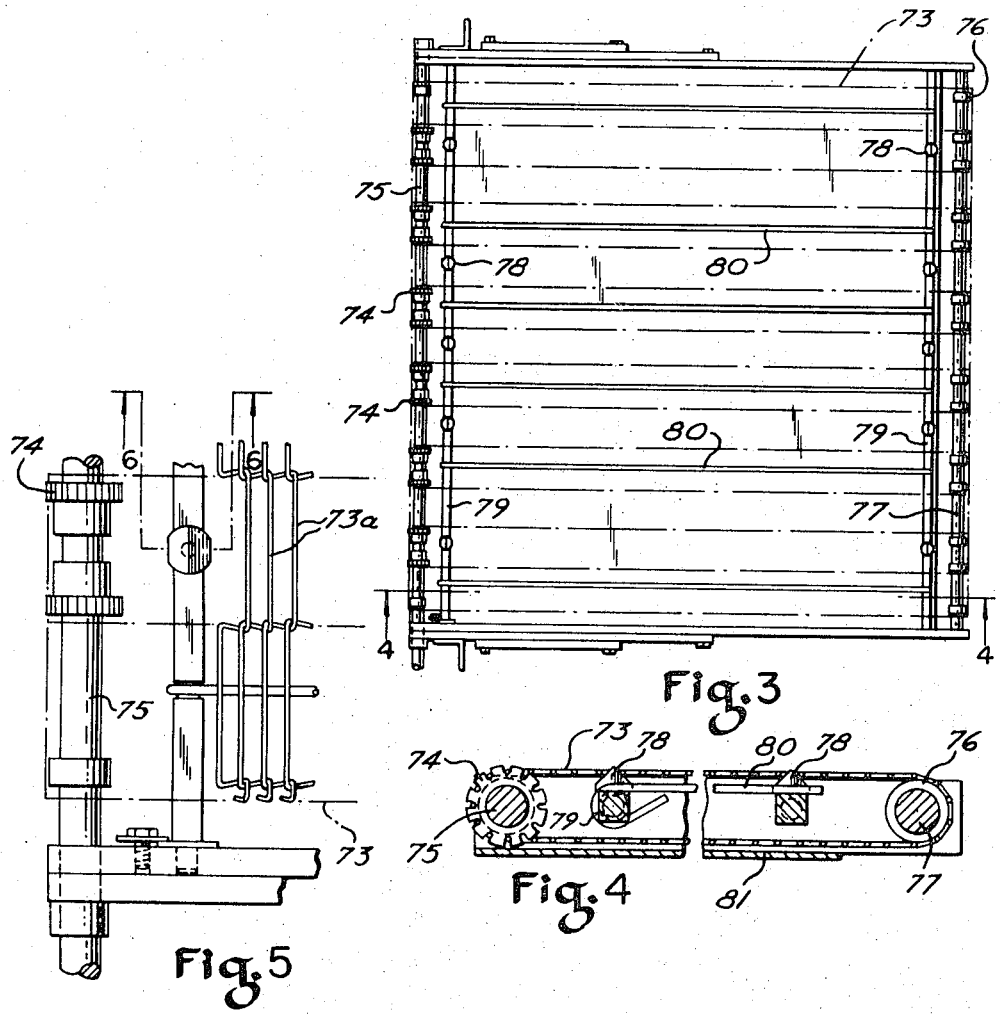

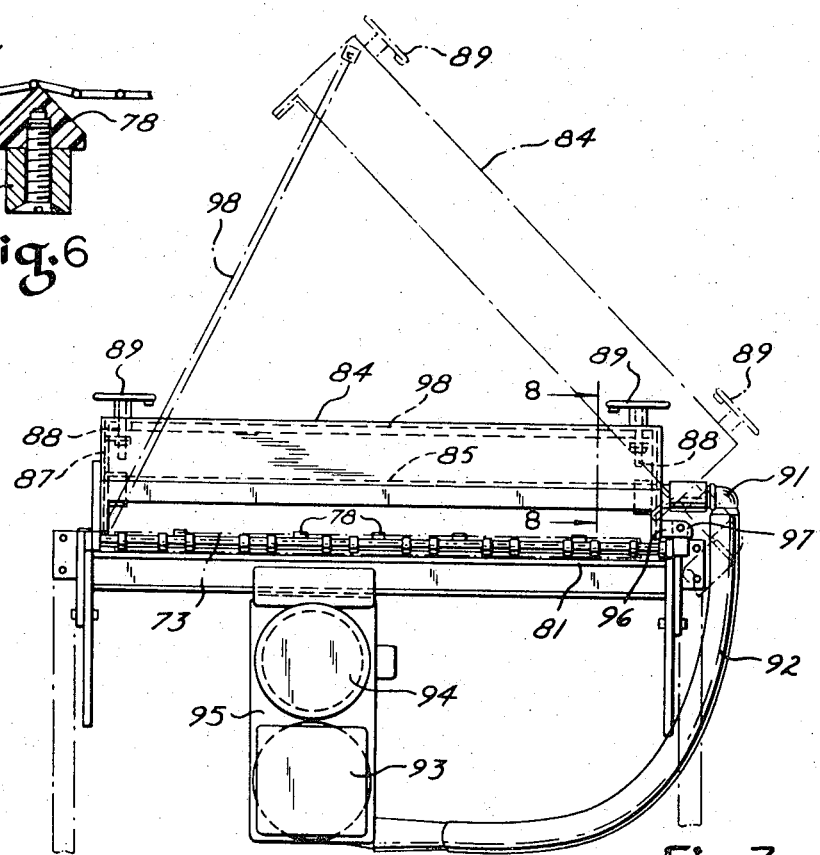
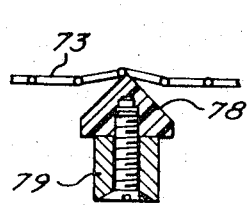
Fig.6
Fig.7
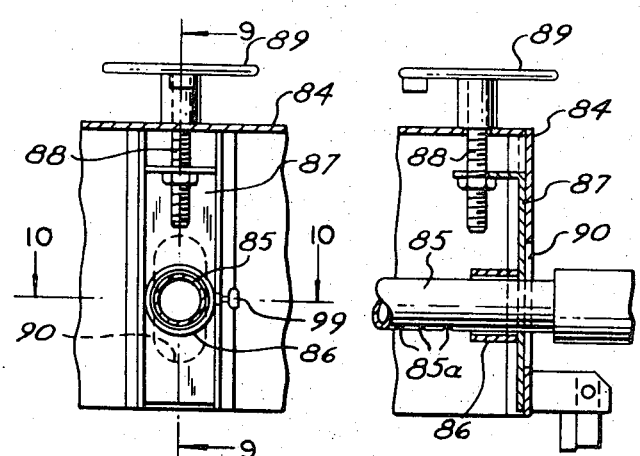

Fig.10

BREADING MACHINE CONVEYOR

This application is a division of my copending application Ser. No. 192,170, filed Oct. 26, 1971, now U.S. Pat. No. 3,762,363, granted Oct. 2, 1973, which in turn was a division of my application Ser. No. 2,239, filed Jan. 12, 1970, now U.S. Pat. No. 3,647,189, granted Mar. 7, 1972, which in turn was a division of my patent application Ser. No. 740,701, filed June 2, 1968, now U.S. Pat. No. 3,547,075, granted Dec. 15, 1970.

The term "breading material" as included in the specification and claims hereof is intended to include any finely divided solid material for coating food products, including, among other things, flour, prepared breading mix, ground bread and cracker crumbs, ground spices, and other materials.

An object of the invention is to provide a flip bar to cause the food product to flip over on the open mesh belt near the discharge end of the machine if necessary to shake breading material out of the cavities in the food product, such as the breast of a chicken. This flip bar raises a portion of the belt above the normal level and a novel take-up is provided for the excess belt material permitting different heights of the flip bar using the same length of belt.

Other objects and advantages of this invention will be apparent from the accompanying drawings and description and the essential features thereof will be set forth in the appended claims.

In the drawings,

FIG. 3 is a top plan view, enlarged, taken along the line 3—3 of FIG. 2;

FIG. 4 is a sectional view taken along the line 4—4 of FIG. 3;

FIG. 5 shows the lower left-hand portion of FIG. 3, enlarged;

FIG. 6 is a sectional view taken along the line 6—6 of FIG. 5;

FIG. 7 is an end elevational view taken along the line 7—7 of FIG. 2, enlarged;

FIG. 8 is a sectional view taken along the line 8—8 of FIG. 7;

FIGS. 9 and 10 are sectional views taken along similarly numbered lines of FIG. 8;

Figure 11:
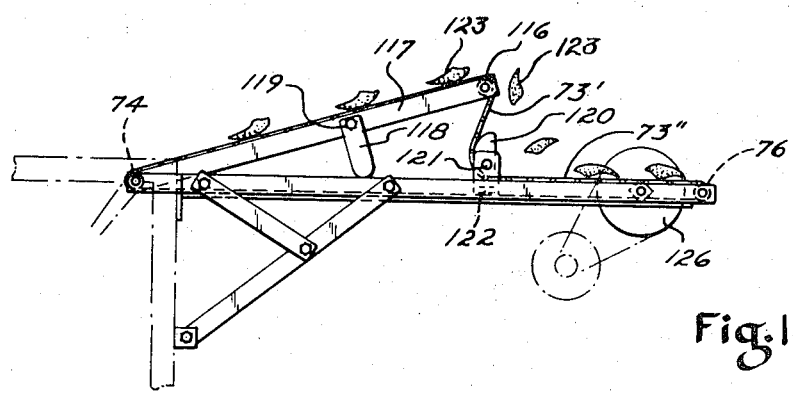
Figure 12:
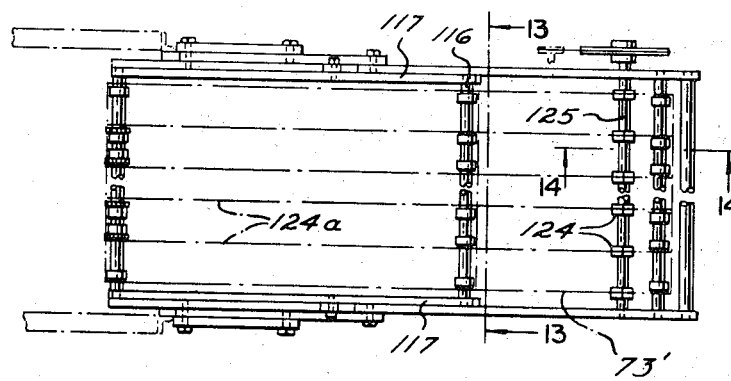
Figure 13:
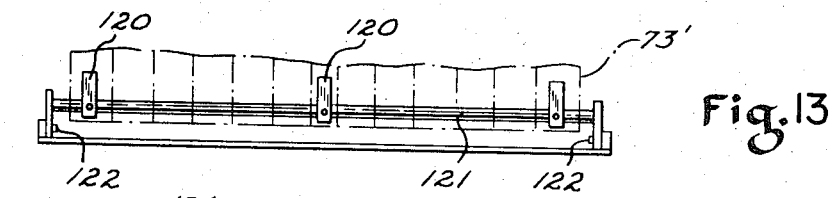
Figure 14:
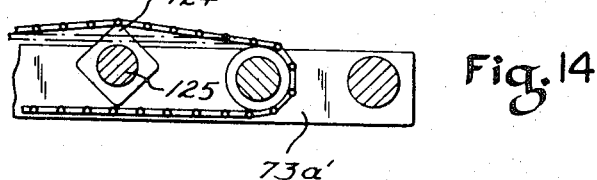

FIGS. 11 and 12 are side elevation and top plan views respectively of a modification to replace the components shown in FIGS. 3 and 4; while FIGS. 13 and 14 are sectional views, enlarged, taken along similarly numbered lines of FIG. 12.

Figure 1:
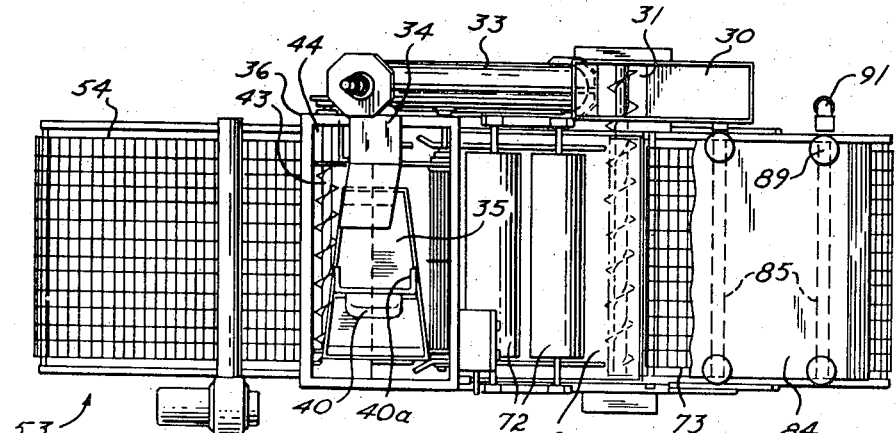
FIG. 1 is a top plan view of the breading machine of this invention.
Figure 2:
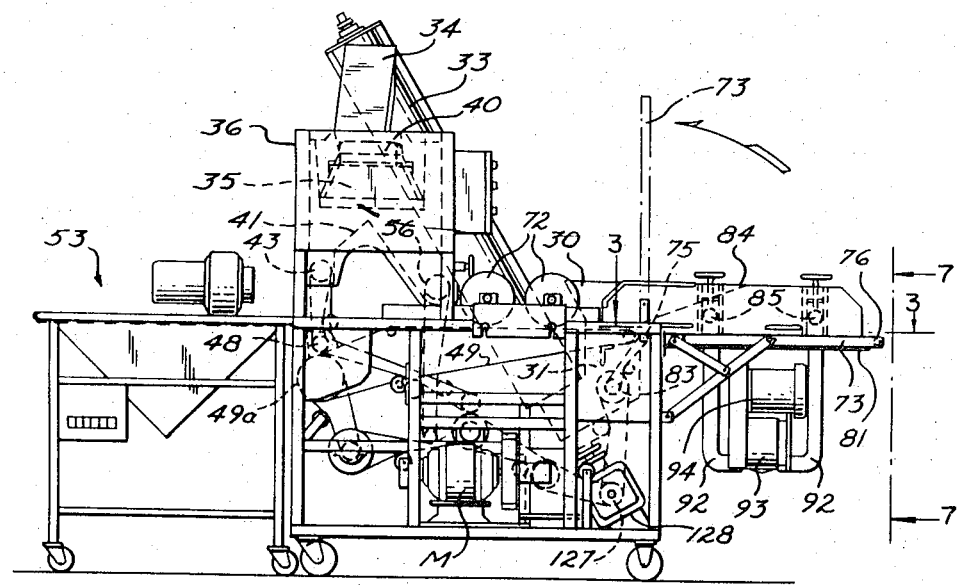
FIG. 2 is a side elevational view of the machine of FIG. 1.

For a general understanding of the machine, reference may be had to FIGS. 1 and 2 showing a hopper 30 into which breading material may be deposited and which then passes downwardly through a vertical chute 31 to the intake end of an inclined screw conveyor 32 which carries the breading material upwardly in a generally cylindrical tube 33 for discharge at the upper end through a chute 34 to fall upon a vibrating screen 35 which is supported from the upper portions of a hopper 36. The breading material to form the layer on the conveyor belt beneath the food product moves by gravity from hopper 36 to fall vertically downwardly through a downspout 46. At the lower end of downspout 46, the breading material is fed to a generally horizontal screw conveyor 48 which spreads the breading material across the upper run of an imperforate conveyor belt 49. U.S. Pat. No. 3,547,075, granted Dec. 15, 1970, discloses and claims the apparatus for leveling the breading material and the dispenser beneath the hopper for placing the breading material on the belt 49 beneath the product.

The food product to be coated is first given a coating of batter material in a batter-coating machine indicated generally at 53 at the left-hand end of the machine as shown in FIGS. 1 and 2. This is a known type of machine and further description is believed to be unnecessary here. The batter-coated product is delivered on a wire mesh conveyor 54 over an idler roller 55 for deposit upon the upper run of the belt 49 already described.

Means is provided for feeding breading material in a smooth and controlled manner from the hopper 36 to deposit on top of the food product carried by conveyor belt 49. This apparatus is disclosed and claimed in my U.S. Pat. No. 3,647,189, granted Mar. 7, 1972.

Downstream from the top breading operation and above the conveyor belt 49 two pressure rolls 72 are rotatably mounted in the frame of the machine and resiliently pressed toward conveyor belt 49 so as to press the breading material into the food product as it passes beneath these rolls.

Beyond the pressure rolls 72 the food product is transferred from belt 49 to the upper run of an open mesh wire belt conveyor 73 driven toward the right as seen in FIG. 2 by a plurality of drive sprockets 74 mounted on a drive shaft 75 journaled in the frame of the machine and extending across the entire width of the conveyor belt as clearly seen in FIGS. 3, 4 and 5. The general character of the wire mesh belt is shown in FIG. 5 and the drive sprockets engage the laterally extending straight wire portions 73a clearly designated in FIG. 5. Idler collars 76 are provided on cross shaft at the discharge end of conveyor belt 73 as clearly shown in FIGS. 3 and 4.

Means is provided for vibrating the conveyor belt 73 so as to shake off excess breading material. The means shown in FIGS. 3, 4, 5 and 6 comprises a plurality of inverted V-shaped members 78 firmly held by cross bars 79 fixed in the frame of the machine so that the tips of members 78 engage the straight wire belt portions 73a during travel of the conveyor belt thus causing it to vibrate. It will be noted in FIGS. 3 and 4 that there are two of the bars 79 supporting the V-shape projections 78 spaced longitudinally of the conveyor 73 and tied together by a plurality of tie rods 80 which are fixed to one of the bars 79 and looped over the other bar. The breading material shaken off belt 73 falls onto a horizontal plate 81 supported on the frame of the machine beneath the lower run of belt 73 in position for the belt to keep the plate 81 clear of breading material as the lower run of the belt passes toward the left in FIG. 4 carrying the loose breading material into a recess 82 extending crosswise of the machine and provided with a screw conveyor 83 which is driven in a direction to carry the breading material crosswise to the downwardly extending chute 31 beneath the hopper 30 previously described. The material shaken from belt 73 is thus carried back to the screw 32 to be returned to the top of the machine.

Figures 8, 9:

As shown in FIGS. 1, 2 and 7, a portion of conveyor 73 has the space above it enclosed in a hood 84 which is open only at the opposite ends over the conveyor belt sufficiently to permit the passage of product into and out of the hood. Suspended from the roof of the hood are two air pipes 85 extending above and crosswise of the belt and perforated on their lower sides so as to blow a blast of air upon the breaded food product traveling along belt 73 to dislodge loose breading material. Means is provided near each side of the belt with respect to each of the pipes 85 to adjust the height thereof above the belt. This is clearly seen in FIGS. 7, 8 and 9 where each pipe is mounted in a sleeve 86 rigid with an L-shape bracket 87 which is adjustable vertically by means of a threaded rod 88 which has a threaded connection with the bracket 87 and is manipulatable by a knob 89 available above the roof of the hood. Slotted openings 90 in the vertical wall of the hood permit this adjustment. Each pipe 85 is connected outside of the hood by means of an elbow 91 with a flexible hose 92 which extends beneath the frame of the machine and is supplied with air under pressure from a compressor 93 driven by a motor 94 mounted in a bracket 95 which is connected with the frame of the machine. At the right-hand side of FIG. 7, the hood is connected by bracket 96 to one or more hinge pin connections 97 so that the hood may be swung from the full line position of FIG. 7 to the dot-dash position shown there while the machine is in operation. The flexible hose connections 92 permit this movement of the hood and pipes 85. The hood may be braced in its raised position by a brace 98 shown in dot-dash lines in the bracing position and shown in broken lines stored inside the hood when not in use. This apparatus is disclosed and claimed in my copending application Ser. No. 192,170, filed Oct. 26, 1971, now U.S. Pat. No. 3,762,363 granted Oct. 2, 1973.

If necessary or desirable, means can be provided for holding each of the pipes 85 is adjusted position so that the air openings 85a are directed as desired by the operator. This shows a set screw 99 in the sleeve 86 which will hold each pipe 85 oriented about its own axis in the position desired.

As illustrated in FIG. 2, conveyor 73 may be swung upwardly in the direction of the arrow about shaft 75 which carries the drive sprocket 74 to assume the dot-dash position of that Figure. Means is provided, if desired, to pin the conveyor 73 in the dot-dash position for purposes of working on the machine.

In some cases it is desirable to flip the food product over after it has been coated with breading material to dislodge excess breading material which may have packed into a hollow portion of the food product such as the breast of a chicken. A modification for this purpose is shown in FIGS. 11 through 14. Here the open wire mesh conveyor belt 73' is like that previously described except that the belt 73' is longer than sufficient to stretch with the upper and lower straight runs between the drive sprockets 74 and the idler collars 76. A support bar 116 is supported by a pair of arms 117 at opposite sides of the conveyor which are pivoted on shaft 75 which carries the drive sprockets 74. Each of the arms 117 has a prop member 118 adapted to be fixed to its associated arm 117 in various adjusted positions by bolt means 119. This permits different heights of the support bar 116 held by the props 118 which engage against the side rails of the conveyor 73a'. The excess material of the conveyor belt extends as a bight between the support bar 116 and Nylon tightening members 120 which are mounted on bar 121 extending crosswise of the conveyor and adjustable by means of a bolt and slot connection 122 in the side rails of the conveyor to press the Nylon members 120 against the slack material of conveyor belt 73' to hold it taut. With this arrangement, the height of the support bar may be varied without changing the length of the belt because the excess of slack material of the belt is always taken up by the Nylon members 120. By this means, food products 123 are raised to the height of the support bar and then flip over as they drop down to the upper run of the conveyor belt at 73'' so as to knock off excess breading material.

The belt 73'' may be vibrated near the discharge end thereof to dislodge any breading material lying on the wire mesh conveyor belt. To this end, mechanically driven belt vibrator blocks 124 are shown fixed to a cross shaft 125 which is rotatably mounted in the side bars 73a' of the conveyor and rotated by a drive pulley 126 so as to cause the corners of the blocks 124 to alternately lift and drop the upper run of the conveyor belt as illustrated in FIG. 14. The blocks 124 are shown generally square but they can be other polygonal form. Preferably, the blocks 124 engage the conveyor belt at portions thereof indicated at 124a in FIG. 12 where short lengths of wire run continuously along the length of the conveyor belt.

Suitable means is provided for driving all of the components hereinabove described in the directions necessary to carry out their functions. It is thought that the details of these drives form no part of the present invention and would only be confusing. Referring to FIG. 2, a motor M is shown mounted in the lower portion of the frame of the machine and through suitable belts, chains and pulleys, together with belt tighteners and idlers, drive the screw conveyors 43 and 48, the drive pulley 49a for conveyor belt 49, the feeding device 56, the screw conveyor 83, the drive shaft 75 for conveyor 73 or 73', and a drive sprocket 127 acting through gear box 128 to drive the inclined screw conveyor 32 in the tubular housing 33.

The machine thus described will efficiently coat food products and finely divided breading material smoothly and continuously and in a controlled manner.

What is claimed is:

1. In a machine for coating a food product with breading material, an open mesh endless wire belt for conveying coated product, a conveyor frame having parallel side rails, pulleys supported in said side rails at each end of said belt ends about which said belt travels including a drive shaft carrying said pulleys at the upstream end of said belt, said belt being longer than sufficient to stretch with upper and lower straight runs between said pulleys, means including a support bar extending at right angles to said belt and engaging said belt, a pair of support arms pivoted on said drive shaft at opposite sides of said belt, an adjustable prop member pivotally supported on each support arm and in position to engage its free end against the associated side rail for lifting a zone of said belt above said upper run, and means engaging a bight of said belt between said support bar and the level of said upper straight run and holding said excess length of belt under tension, whereby the height of said support bar for flipping over pieces of product may be varied without changing the length of said belt.

* * * * *